(12) United States Patent
Wycuff (10) Patent No.: US 9,783,868 B2
(45) Date of Patent: Oct. 10, 2017

(54) DROSS PROCESSING SYSTEM

(71) Applicant: Charles Clayton Wycuff, Wapakoneta, OH (US)

(72) Inventor: Charles Clayton Wycuff, Wapakoneta, OH (US)

( * ) Notice: Subject to any disclaimer, the term of this patent is extended or adjusted under 35 U.S.C. 154(b) by 97 days.

(21) Appl. No.: 14/625,861

(22) Filed: Feb. 19, 2015

(65) Prior Publication Data

US 2015/0159238 A1      Jun. 11, 2015

Related U.S. Application Data

(63) Continuation of application No. 13/784,102, filed on Mar. 4, 2013, now abandoned.

(51) Int. Cl.
| | | |
|---|---|---|
| *F27B 14/10* | (2006.01) | |
| *F27B 14/12* | (2006.01) | |
| *C22B 7/04* | (2006.01) | |
| *C22B 21/00* | (2006.01) | |
| *F27B 14/08* | (2006.01) | |

(52) U.S. Cl.
CPC .......... *C22B 7/04* (2013.01); *C22B 21/0069* (2013.01); *F27B 14/0806* (2013.01); *F27B 14/10* (2013.01); *F27B 14/12* (2013.01); *F27B 2014/0843* (2013.01); *Y02P 10/212* (2015.11)

(58) Field of Classification Search
CPC ......... B22D 41/00; B22D 4/102; F27B 14/10; F27B 2014/1041
See application file for complete search history.

(56) References Cited

U.S. PATENT DOCUMENTS

| | | | | |
|---|---|---|---|---|
| 2,446,222 | A | * | 8/1948 | Fletcher ................. C22B 5/16 110/343 |
| 2,754,199 | A | | 7/1956 | Stroup et al. |
| 2,865,715 | A | | 12/1958 | Jonas |
| 3,198,505 | A | | 8/1965 | Amdur et al. |

(Continued)

FOREIGN PATENT DOCUMENTS

GB            937213 A      9/1963

OTHER PUBLICATIONS

"Refractory (industrial material)", Encyclopedia Britannica, Encyclopedia Britannica Online, Encyclopedia Britannica Inc. 2014, Web. Aug. 12, 2014 at http://www.britannica.com/EBchecked/topic/495715/refractory (3 pages).

(Continued)

*Primary Examiner* — George Wyszomierski
*Assistant Examiner* — Tima M McGuthry Banks
(74) *Attorney, Agent, or Firm* — Hasse & Nesbitt LLC; Daniel F. Nesbitt (57) ABSTRACT

A dross processing system crucible comprising a substantially vertical inner wall having an upper end, a lower end, an outer surface, and an inner surface, a bottom having an upper surface and a lower surface, the upper surface affixed to the lower end of the inner wall. A blockable port is disposed in the bottom, and a thermal insulating material covers the outer surface of the vertical inner wall and the lower surface of the bottom. An outer vessel is affixed to the upper end of the substantially vertical inner wall, and the thermal insulating material is disposed between the outer surface of the inner wall and the outer vessel.

11 Claims, 6 Drawing Sheets

(56) References Cited

U.S. PATENT DOCUMENTS

| | | | |
|---|---|---|---|
| 3,417,930 A | 12/1968 | Brumagin et al. | |
| 3,517,918 A | 6/1970 | Cenkner | |
| 3,689,049 A * | 9/1972 | Brumagin | C22B 7/04 |
| | | | 266/137 |
| 3,901,415 A | 8/1975 | Shepherd et al. | |
| 3,999,980 A | 12/1976 | Montagna | |
| 4,121,810 A | 10/1978 | Lui et al. | |
| 4,386,956 A | 6/1983 | Roth et al. | |
| 4,386,959 A | 6/1983 | Frehn | |
| 4,938,457 A | 7/1990 | Singleton, Jr. | |
| 5,470,376 A | 11/1995 | Dube et al. | |
| 5,997,802 A | 12/1999 | Holcombe, Jr. et al. | |
| 6,136,262 A | 10/2000 | Groteke | |
| 6,464,929 B1 | 10/2002 | Groteke | |
| 6,555,050 B1 | 4/2003 | Groteke et al. | |
| 7,935,302 B1 | 5/2011 | Groteke | |

OTHER PUBLICATIONS

"Deltacast 696—Ladle and Launder", Acheson Product Data Sheet, Henkel AG & Co., copyright 2009, published prior to Mar. 4, 2013 (3 pages).

* cited by examiner

DROSS PROCESSING SYSTEM

CROSS REFERENCE TO RELATED APPLICATION

This application is a continuation of U.S. application Ser. No. 13/784,102 filed Mar. 4, 2013, the disclosure of which is incorporated by reference in its entirety.

FIELD OF THE INVENTION

This invention relates to a dross processing system for recovering metal from molten dross, and more particularly, to an insulated crucible used in a dross processing system for recovering metal from molten dross.

BACKGROUND OF THE INVENTION

In a dross processing system, a metal-bearing dross is removed from the metal melt of a furnace and is placed into a crucible of the dross processing system. An exothermic flux is added and the dross is then stirred to mix the exothermic flux into the dross and to cause molten metal droplets to coalesce in the dross. The molten metal is then allowed to drain from the dross, forming a pool in a bottom region of the crucible with spent (demetalized) dross residing thereabove. After allowing the metal to pool for a sufficient time, a drain plug in the bottom region of the reaction vessel is removed to allow the molten metal to drain into a receptacle for recovery. After draining the molten metal, the crucible is moved to a dump position where the spent dross is free to fall into a container for disposal. The reaction vessel is then returned to a loading/processing position to receive another batch of dross for processing.

SUMMARY OF THE INVENTION

This invention relates to a dross processing system crucible comprising a substantially vertical inner wall having an upper end, a lower end, an outer surface, and an inner surface, a bottom having an upper surface and a lower surface, the upper surface affixed to the lower end of the inner wall, a blockable port disposed in the bottom, a thermal insulating material covering the outer surface of the vertical inner wall and the lower surface of the bottom, and an outer vessel affixed to the upper end of the substantially vertical inner wall, wherein the thermal insulating material is disposed between the outer surface of the inner wall and the outer vessel.

This invention also relates to a method for processing dross, comprising providing a dross processing system crucible comprising a substantially vertical inner wall having an upper end, a lower end, an outer surface, and an inner surface, a bottom having an upper surface and a lower surface, the upper surface affixed to the lower end of the inner wall, a blockable port disposed in the bottom, a thermal insulating material covering the outer surface of the vertical inner wall and the lower surface of the bottom, and an outer vessel affixed to the upper end of the substantially vertical inner wall, wherein the thermal insulating material is disposed between the outer surface of the inner wall and the outer vessel, pouring molten dross into the crucible, pouring an exothermic flux into the crucible containing the molten dross, stirring the dross and flux to enhance an exothermic reaction, maintaining heat within the crucible by placing a lid on the pot, and allowing the dross and flux to sit a predetermined amount of time.

This invention further relates to a dross processing system comprising a frame, a crucible frame pivotably mounted to the frame a crucible comprising a substantially vertical inner wall having an upper end, a lower end, an outer surface, and an inner surface, a bottom having an upper surface and a lower surface, the upper surface affixed to the lower end of the inner wall, a blockable port disposed in the bottom, a thermal insulating material covering the outer surface of the vertical inner wall and the lower surface of the bottom, and an outer vessel affixed to the upper end of the substantially vertical inner wall, wherein the thermal insulating material is disposed between the outer surface of the inner wall and the outer vessel, whereas the crucible is disposed in the crucible frame, a stirring mechanism moveably mounted to the frame, whereas the stirring mechanism is pivotable between a position above the crucible to a position away from the crucible, an insulated lid pivotably mounted to the frame, whereas the lid is movable between a position above the crucible to a position away from the crucible, and a metal collection pan located on the frame below the crucible holder.

DETAILED DESCRIPTION OF THE INVENTION

Figure 1:
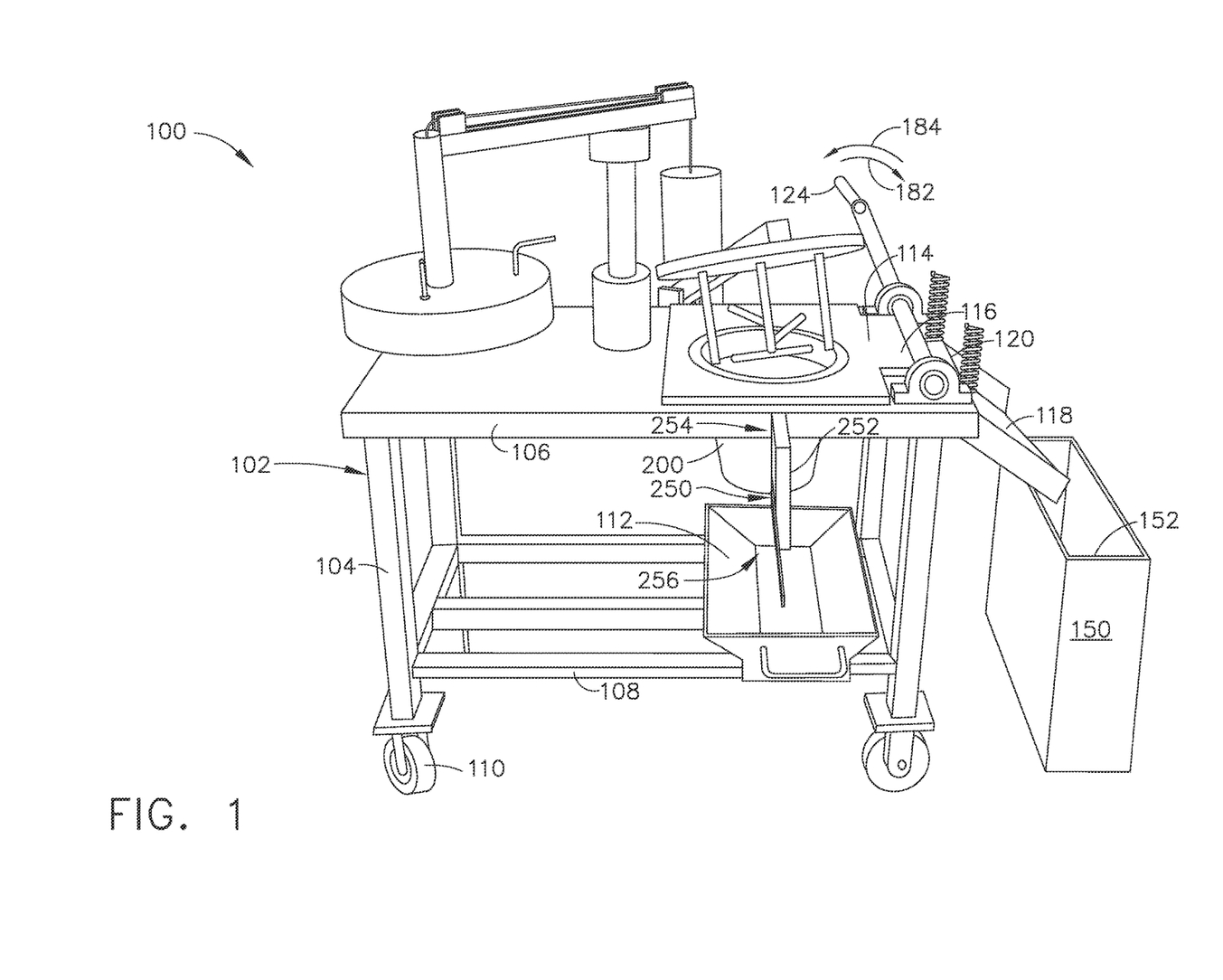
FIG. 1 is a perspective view of a dross processing system of the invention.
Figure 2:
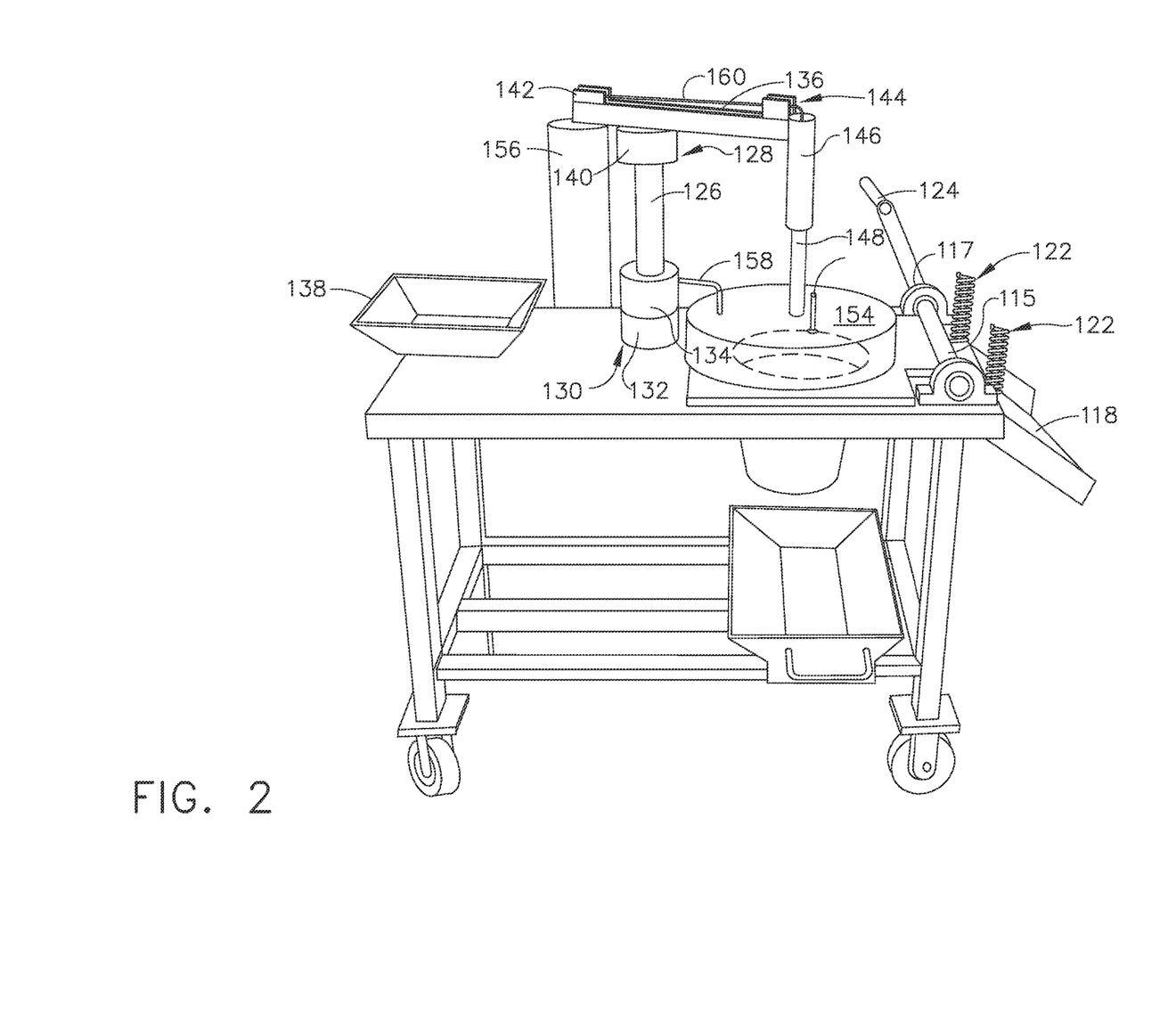
FIG. 2 is another perspective view of the dross processing system of FIG. 1, with a stirrer and plug removal tool not shown for clarity.

FIG. 1 illustrates an embodiment of an improved dross processing system 100. The dross processing system 100 has a frame 102 which includes an upper platform 106, a lower horizontal frame 108, and vertical support 104 therebetween. The frame 102 is mounted on wheels 110 to allow the drossing processing system 100 to be moved.

Figure 3:
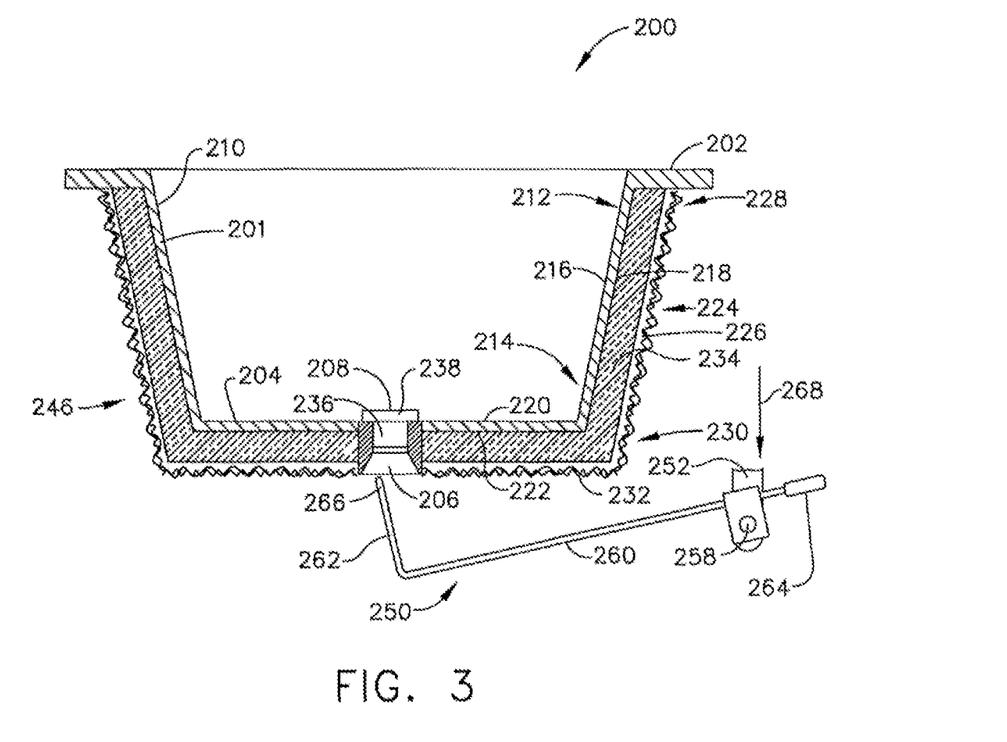
FIG. 3 is a section view of a crucible and plug removal tool of the invention.

The dross processing system 100 is also provided with a crucible 200 which holds the dross to be processed. Typically, the crucible 200 is a metal double-walled insulated crucible. As shown in FIG. 3, the crucible includes an upper rim 202 and a bottom 204 spaced apart therefrom, the bottom terminating in a drain port 206. Substantially vertical inside walls 210 are disposed between the upper rim 202 and the bottom 204. A plug 208 is provided which seals the drain port 206 and maintains the metal and dross within the crucible 200. The crucible 200 is mounted to a crucible frame 114 which is pivotably mounted to the upper platform 106 by a pivot mount 116. The crucible 200 is preferably attached to the crucible frame 114 by bolts which pass through both the upper rim 202 and the crucible frame 114, and which are secured by nuts. Here, the pivot mount is a bar 115 mounted to the crucible frame 114 and disposed in at least one bearing 117 that is mounted to the upper platform 106. A handle 124 allows a user to pivot the crucible frame 114 between a dross receiving position shown in FIG. 1 and a dross removal position shown in FIG. 5.

The dross processing system 100 includes a metal collection pan 112. The metal collection pan 112 is positioned relative to the crucible frame 114 such that metal passing through the crucible drain port 206 drains into the metal collection pan 112. Typically, the metal collection pan 112 is removably mounted to lower horizontal frame 108 to facilitate removal of the collection pan 112 and collected metal.

Spent dross is stored in a spent dross container 150. A chute 118 is pivotably attached to the upper platform 106 by a chute pivot mount 120. When the dross processing system 100 is positioned at the spent dross container 150, the chute 118 may be rested on a rim 152 of the spent dross container 150. The chute 118 is positioned with respect to the frame 102 such that the spent dross falls onto the chute 118 when the crucible 200 is in the spent dross removal position. The chute 118 then directs the spent dross into the spent dross container 150.

To limit the pivotable motion of the crucible 200 when the crucible is moved to the spent dross removal position. Springs 122 limit the pivotable motion of the crucible frame 114 such that, when the crucible 200 is in the spent dross removal position, it is inclined from horizontal by an angle between about 0 degrees and 60 degrees, the preferred angle being dependent on the angle of repose of the spent dross material.

The upper platform 106 supports a vertical support 126 having an upper end 128 and a lower end 130. The lower end 130 is mounted to the upper platform 106 with a flange 132. The flange may be affixed by bolting, welding, or other methods of affixing. A lower collar 134 is pivotably disposed about the vertical support 126 at the lower end 130 of the vertical support.

Disposed on the upper end 128 of the vertical support 126 is an upper collar 140 located between a weighted end 142 and a lid end 144 of an arm 136. Vertically attached to the lid end 144 of the arm 136 is a sleeve 146 that slideably holds a lid support bar 148. An insulated lid 154 having at least one handle 158 is affixed to the lid support bar 148. A weight 156 for counterbalancing the lid 154 is attached to the lid support bar 148 by a cable 160. The lid 154 is rotatable from a first position away from the crucible to a position above the crucible when the crucible is in a dross receiving position for receiving dross and funneling it into the crucible.

A funnel 138 is provided and is placed on top of the crucible to assist in filling the crucible with molten dross.

Figure 4:
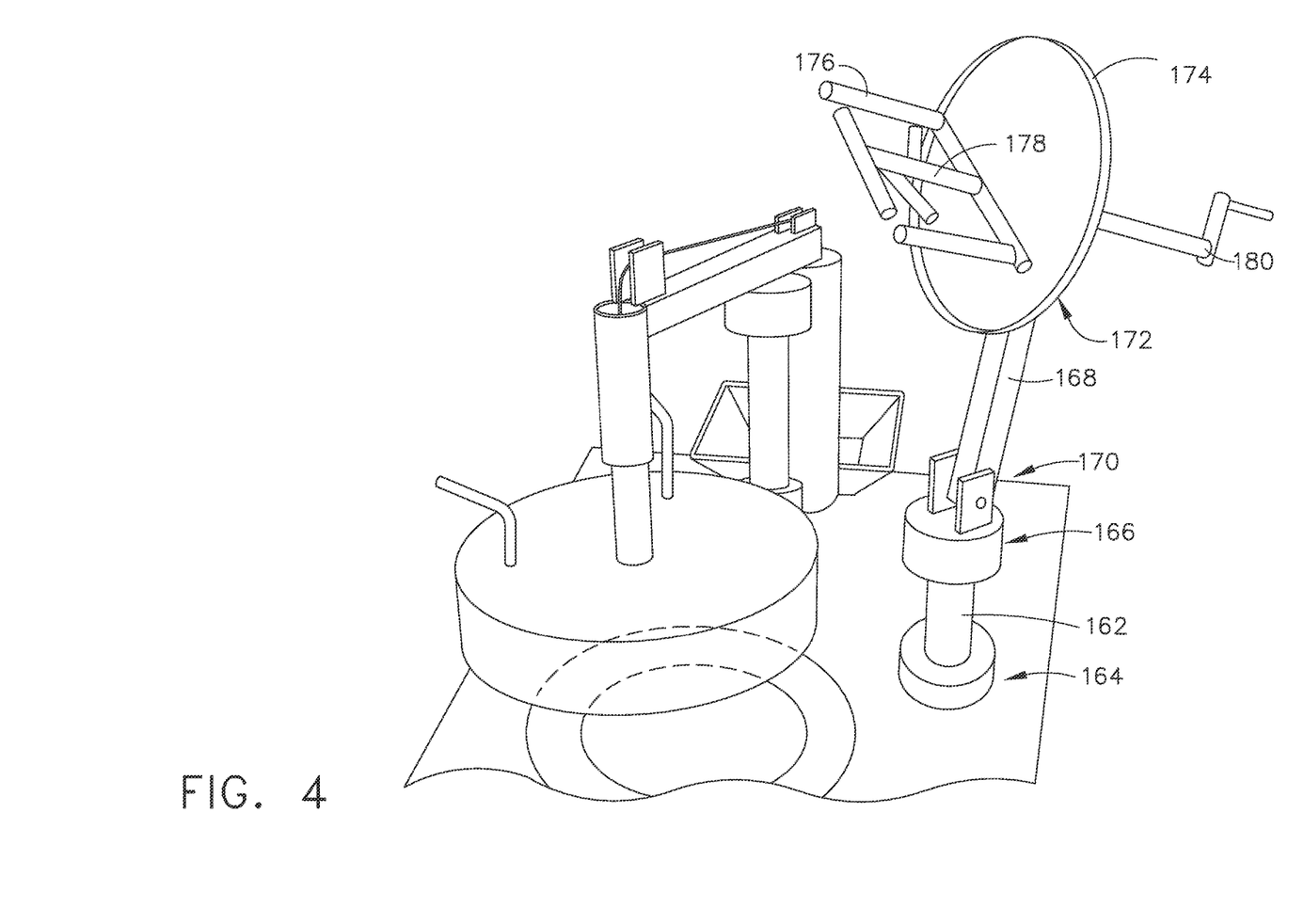
FIG. 4 is a partial perspective view of the dross processing system of FIG. 1.

As shown in FIG. 4, an affixed end 164 of a stirrer support 162 is affixed to the upper platform 106. Pivotably mounted to an arm end 166 of the stirrer support 162 is a stirrer arm 168 having its pivoting end 170 affixed to the arm end 166 of the stirrer support 162. A stirrer lid 174 is affixed to the stirrer end 172 of the stirrer arm 168. A stirrer 176 is rotatably mounted to the stirrer end 172 of the stirring arm 168 by a stirring shaft 178 that passes through the stirrer lid 174 and the stirrer end 172 of the stirring arm 168 and terminates in a stirrer handle 180. The pivotably mounted stirring arm 168 allows the stirrer 176 to be pivoted between an open position away from the crucible 200 and a stirring position with the stirrer 176 disposed in the crucible.

FIG. 3 shows one embodiment of a crucible that can be used with the dross processing system. The crucible 200 is typically circular in shape and has an inner vessel 201 with a substantially vertical inside wall 210 having an upper end 212, a lower end 214, an inner surface 216, and an outer surface 218. The bottom 204, having an upper surface 220 and a lower surface 222, is affixed to the lower end 214 of the inside wall 210 and has a drain port 206. A rim 202 is affixed to the upper end 212 of the inside wall 210. Affixed to the rim 202 by welding, bolting or other methods of connection is an outer vessel 224 having a substantially vertical side wall 226 with an upper end 228 and a lower end 230, and a bottom 232 connected to the lower end 230. Disposed between the inner vessel 201 and the outer vessel 224 is an insulating layer 234.

The inner vessel of the crucible is typically made from stainless steel with a thickness typically between 0.05 and 0.25 inches, more typically between 0.1 and 0.15 inches, and most typically between 0.12 and 0.13 inches. The bottom of the crucible inner vessel is typically made from stainless steel with a thickness typically between 0.1 and 0.4 inches, more typically between 0.2 and 0.3 inches, and most typically between 0.24 and 0.26 inches. To protect the crucible from molten dross and to prolong crucible life, a coating is applied to the inner surface 216 of the inside wall 210 and the upper surface 220 of the bottom 204. The coatings are typically a soft grease containing refractory pigments that produce a dry, aerated insulating coating when immersed in molten metal. One example of such a product is Deltacast™ 696 manufactured by Acheson. The coating is applied with a brush and is cured by pouring molten metal in the crucible.

The insulation material is typically a ceramic insulation with a maximum temperature rating of at least 2300 degrees F. One example of such a product is a Kaowool blanket manufactured by Morgan Thermal Ceramics. The outer vessel 226 is typically made from an expanded metal stainless steel mesh 246, as shown in FIG. 3, and its purpose is to hold the insulation material against the inner vessel.

The crucible is typically provided with a drain tube and plug combination where the drain tube can be readily opened by pushing up from below with a plug removal tool. For the crucible 200, the plug 208 has a plug body 236 having a uniform cross section with a expanded cap 238 that will engage the drain port 206 in the bottom 204 of the crucible 200. Other configurations of plugs could be employed, so long as they are designed to remain in place against the head of molten metal and dross which is being stirred in the crucible. For small reaction vessels, a wad of suitable material such as refractory wool could be employed. However, while the plug 208 must remain in place while the metal is being collected, the plug 208 must be readily removable from the drain port 206 by pushing from below.

In operation, the dross processing system is located near the molten dross source. Dross is skimmed from the surface of the metal bath and is loaded through the funnel into the dross receiving crucible having a bottom port. The bottom port is sealed with a removable plug.

After the dross is placed in the crucible, an exothermic flux is into the dross to promote coalescence of the liquid metal dispersed through the dross. Various types and amounts of exothermic fluxes may be used. Typically, smokeless fluxes are preferred over fluxes that generate smoke when used. One example of a flux that is preferred contains, by weight, 5-10% sodium Nitrate, 10-25% sodium sulfate, 0.5-1.5% calcium carbonate, 5-10% sodium silicofluoride, 2-5% sodium carbonate, 1-10% sodium aluminum fluoride, 40-60% sodium chloride, and 10-25% potassium chloride.

The stirrer arm is then pivoted downward, allowing the stirrer 176 to move into the dross loaded crucible 200 and the stirrer lid 174 to settle on top of the crucible 200. The user then turns the stirrer handle 180 to rotate the stirrer 176 and mix the flux with the dross. The stirrer lid 174 provides shield from heat and sparks as the exothermic flux reacts with the dross. The mixing tends to promote coalescence of the entrapped metal and formation of a molten pool of metal in the lower region of the crucible as the entrapped metal percolates through the dross, leaving behind a granular spent dross. The metal is somewhat cleansed by percolating through the dross, being largely free of oxides. The pooled metal forms an insulating layer which helps protect the bottom of the crucible from attack by the exothermic flux and the dross. The stirring is typically more effective if the stirring motion is varied. One way to vary the stirring motion is to rotate the stirrer in one direction for a certain interval of time, and then rotate it in the opposite direction for a length of time, this cycle repeating until the desired duration of processing has elapsed. Typically, the dross and flux is mixed for a predetermined amount of time between 1 and 25 seconds, more typically between 3 and 15 seconds, and most typically between 5 and 10 seconds. Other methods of stirring the dross and flux, such as a stirring rod of a material of sufficient strength and thermal resistance to withstand the heat of the dross, may also be used. After mixing for the predetermined amount of time, the stirrer arm is rotated to an upward position, removing the stirrer 176 from the crucible 200.

The insulated lid 154 is then rotated to a position above the crucible 200 and the lid is pushed downward by use of handle 158 to close the crucible. The insulated lid 154 assists in maintaining heat in the crucible during the continued exothermic reaction. Typically, the insulated lid is left to cover the crucible for a predetermined amount of time between 2 and 8 minutes, more typically for between 3 and 7 minutes, more typically between 4 and 6 minutes, and most typically for about 5 minutes. After covering the pot for the predetermined amount of time, the lid is removed and rotated away from the crucible. During the exothermic reaction, the molten metal, typically aluminum is separated from the dross and collects in the bottom of crucible and the dross floats to the top of the molten aluminum.

To collect the molten aluminum, the plug 208 is knocked out of the drain port 206. Typically, this is done from below with a plug removal tool 250 as shown in FIGS. 1 and 3. An upper end 254 of a plug removal tool support 252 is affixed to the upper platform 106. Connected to a lower end 256 of the support is a pivoting mount 258. An L-shaped bar 260 having a plug knockout end 262 and an operator end 264 is pivotably mounted on the pivoting mount 258, with the pivoting mount located between the plug knockout end and the operator end 264. An upwardly pointing section 266 of the L-shaped bar aligns with the plug 208. To remove the plug 208, the operator pushes downward on the operator end 264 of the L-shaped bar 260 in the direction of arrow 268, which drives the upwardly pointed section 266 into the plug 208, thereby dislodging the plug.

The molten aluminum then drains through drain port 206 into the metal collection pan 112. When the metal collection pan is sufficiently full, the operator removes the pan and places a new pan in the same location below the crucible 200.

Figure 5:
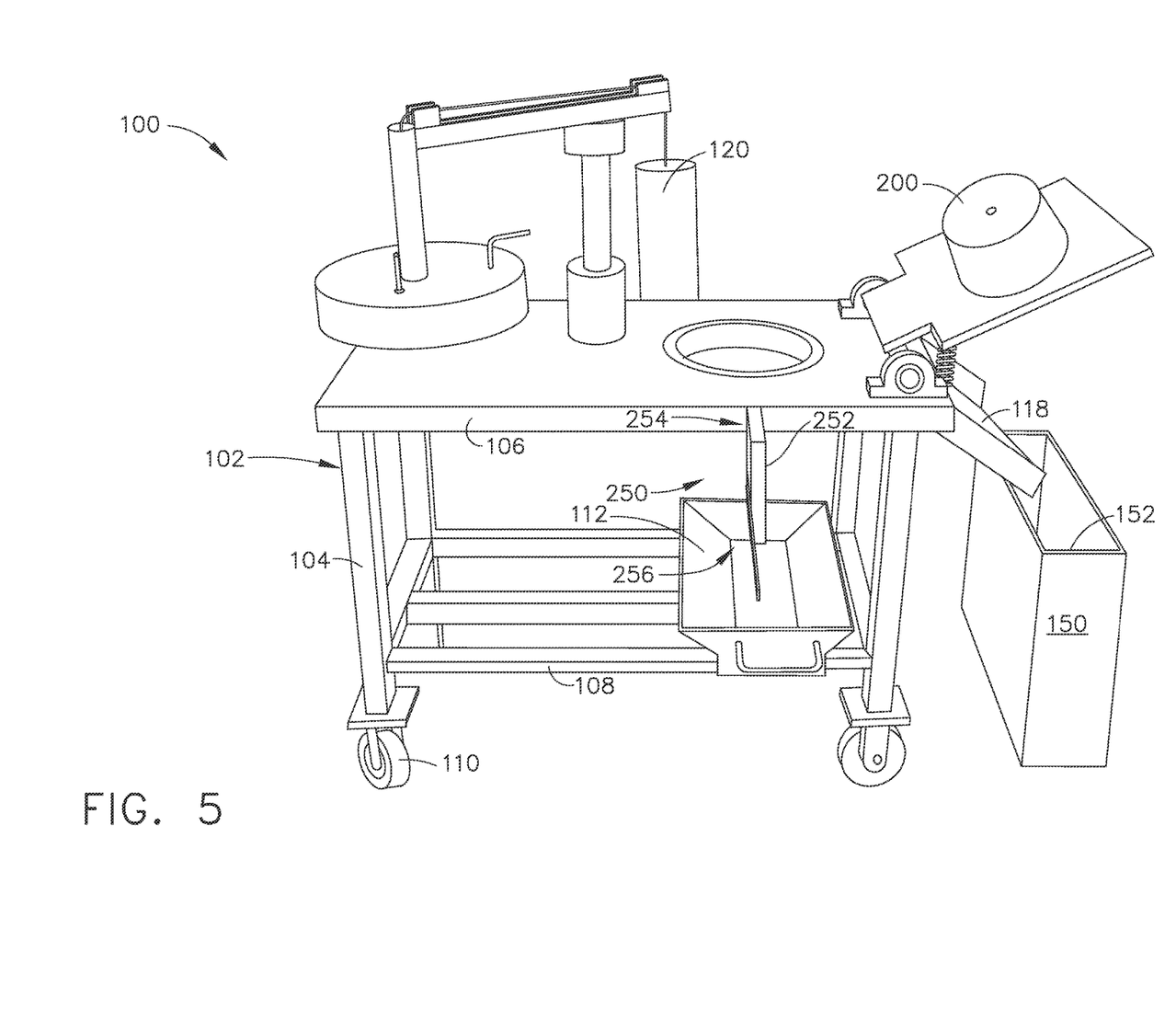
FIG. 5 is a perspective view of the dross processing system of FIG. 1 with a crucible frame and crucible in the dross removal position.

After draining the molten aluminum, spent dross will remain in the crucible. The operator empties the spent dross from the crucible 200 into the spent dross container 150 by rotating handle 124 in the clockwise direction of arrow 182. Rotating the handle 124 causes the crucible frame 114 and crucible 200 to rotate until the crucible frame 114 contacts the springs 122, as shown in FIG. 5. The springs cushion the rotation and allow the operator to bang the crucible frame against the springs to empty the spent dross from the crucible. The spend dross flows from the crucible, down the chute 118 and into the spent dross container 150.

After emptying the spent dross, the handle is rotated counterclockwise in the direction of arrow 184 to place the crucible frame and crucible back in the dross receiving position. The operator then places the plug 208 in the drain port 206. The crucible is then ready to receive another load of dross.

Figure 6:
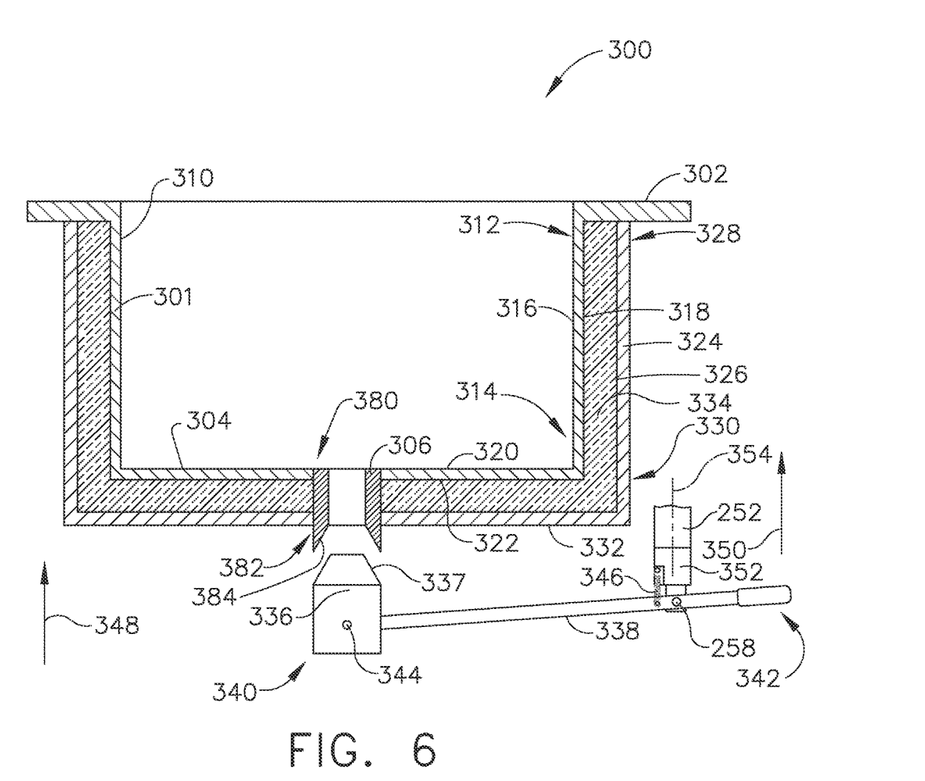
FIG. 6 is a section view of another embodiment of a crucible and plug removal tool of the invention.

FIG. 6 shows another embodiment of a crucible that can be used with the dross processing system. The crucible 300 is typically circular in shape and has an inner vessel 301 with a substantially vertical inside wall 310 having an upper end 312, a lower end 314, an inner surface 316, and an outer surface 318. A bottom 304, having an upper surface 320 and a lower surface 322, is affixed to the lower end 314 of the inside wall 310 and has a drain port 306. A rim 302 is affixed to the upper end 312 of the inside wall 310. Affixed to the rim 302 by welding, bolting or other methods of connection is an outer vessel 324 having a substantially vertical side wall 326 with an upper end 328, a lower end 330, and a bottom 332 connected to the lower end 330. Disposed between the inner vessel 301 and the outer vessel 324 is an insulating layer 334. A drain port 306 has an upper end 380 connected to the bottom 304 of the crucible and a lower end 382 passing through the outer vessel 324 and terminating in an internally tapered portion 384.

The inner vessel of the crucible is typically made from stainless steel with a thickness typically between 0.05 and 0.25 inches, more typically between 0.1 and 0.15 inches, and most typically between 0.12 and 0.13 inches. The bottom of the crucible inner vessel is typically made from stainless steel with a thickness typically between 0.1 and 0.4 inches, more typically between 0.2 and 0.3 inches, and most typically between 0.24 and 0.26 inches. To protect the crucible from molten dross and to prolong crucible life, a coating is applied to the inner surface 316 of the inside wall 310 and the upper surface 320 of the bottom 304. The coatings are typically a soft grease containing refractory pigments that produce a dry, aerated insulating coating when immersed in molten metal. One example of such a product is Deltacast™ 696 manufactured by Acheson. The coating is applied with a brush and is cured by pouring molten metal in the crucible.

The insulation material is typically a ceramic insulation with a maximum temperature rating of at least 2300 degrees F. One example of such a product is a Kaowool blanket manufactured by Morgan Thermal Ceramics. The outer vessel is typically made from an expanded metal stainless steel mesh, and its purpose is to hold the insulation material against the inner vessel.

A shaft 338 having a drain plug end 340 and an operator end 342 is connected to the support 252 by a pivot mount 258. A drain plug 336 is pinned by pin 344 to the drain plug end 340 of the shaft 338. The drain plug 336 has a tapered end 337 adapted to mate with the tapered portion 384 of the drain port 306 to provide a seal. A spring 346, typically in tension, biases the drain plug end 340 of the shaft upward in the direction of arrow 348. When the drain plug 336 is located below the drain port 306 and the spring 346 pulls the plug end 340 of the shaft 338 upward in the direction of arrow 348, the tapered end 337 of the drain plug 336 mates with the tapered portion 384 of the drain port 306, sealing the pot. The tension in the spring 346 maintains the seal between the drain plug 336 and the drain port 306.

To drain molten aluminum from the crucible 300, the operator pulls the operator end 342 of the shaft 338 upward in the direction of arrow 350 to dislodge the plug 336 from the drain port 306. The support 252 may have a lower pivoting section 352 that pivots about an axis 354. The pivoting section 352 allows the operator to pivot the shaft, thereby moving the drain plug 336 laterally away from alignment with the drain port 306. After the operator rotates the crucible to dump the spent dross and returns the crucible to the dross receiving position, the plug is reinserted into the drain port.

While the present invention has been illustrated by the description of embodiments thereof, and while the embodiments have been described in considerable detail, it is not intended to restrict or in any way limit the scope of the appended claims to such detail. Additional advantages and modifications will be readily apparent to those skilled in the art. The invention is therefore not limited to the specific details, representative apparatus and method, and illustrated examples shown and described. Accordingly, departures may be made from such details without departing from the scope or spirit of the invention.

What is claimed is:

1. A dross processing system crucible comprising:
   a. a substantially vertical inner wall having an upper end, a lower end, an outer surface, and an inner surface,
   b. a bottom having an upper surface and a lower surface, the upper surface affixed to the lower end of the inner wall,
   c. a blockable port disposed in the bottom,
   d. a thermal insulating material covering the outer surface of the vertical inner wall and the lower surface of the bottom, and
   e. an outer vessel affixed to the upper end of the substantially vertical inner wall, the outer vessel consisting of a stainless steel expanded metal mesh, wherein the stainless steel expanded metal mesh covers an outside surface of the thermal insulating material.

2. The crucible of claim 1, further comprising a protective coating on the inside surface of the inner wall and on the upper surface of the bottom.

3. The crucible of claim 2, whereas exposure to molten metal causes the coating to become an aerated insulating coating.

4. The crucible of claim 1, wherein the inner wall is stainless steel having a thickness of between 0.05 and 0.25 inches and the bottom is stainless steel having a thickness of between 0.1 and 0.4 inches.

5. The crucible of claim 1, wherein the inner wall is stainless steel having a thickness of between 0.1 and 0.15 inches and the bottom is stainless steel having a thickness of between 0.2 and 0.3 inches.

6. The crucible of claim 1, wherein the inner wall is stainless steel having a thickness of between 0.12 and 0.13 inches and the bottom is stainless steel having a thickness of between 0.24 and 0.26 inches.

7. The crucible of claim 1, wherein the thermal insulating material is a ceramic material.

8. The dross processing system crucible according to claim 1, wherein the thermal insulating material is a blanket of a ceramic thermal insulating material.

9. A dross processing system comprising:
   a. a frame,
   b. a crucible frame pivotably mounted to the frame
   c. a crucible comprising a substantially vertical inner wall having an upper end, a lower end, an outer surface, and an inner surface, a bottom having an upper surface and a lower surface, the upper surface affixed to the lower end of the inner wall, a blockable port disposed in the bottom, a thermal insulating material covering the outer surface of the vertical inner wall and the lower surface of the bottom, and an outer vessel affixed to the upper end of the substantially vertical inner wall, the outer vessel consisting of a stainless steel expanded metal mesh, wherein the stainless steel expanded metal mesh covers an outside surface of the thermal insulating material, whereas the crucible is disposed in the crucible frame,
   d. a stirring mechanism moveably mounted to the frame, whereas the stirring mechanism is pivotable between a position above the crucible to a position away from the crucible,
   e. an insulated lid pivotably mounted to the frame, whereas the lid is movable between a position above the crucible to a position away from the crucible, and
   f. a metal collection pan located on the frame below the crucible holder.

10. The dross processing system of claim 9, further comprising a drain port having a tapered portion and connected to the bottom of the pot and a drain and a drain plug having a tapered end for mating with the tapered portion of the drain port.

11. The dross processing system according to claim 9, wherein the thermal insulating material of the crucible is a blanket of a ceramic thermal insulating material.

* * * * *